April 17, 1951 O. W. KADDATZ 2,549,204
DRAIN CONTROL DEVICE
Filed Sept. 11, 1945

Oscar W. Kaddatz
INVENTOR.

BY Milo B. Stevens & Co.

Attorneys.

Patented Apr. 17, 1951

2,549,204

UNITED STATES PATENT OFFICE 2,549,204

DRAIN CONTROL DEVICE

Oscar W. Kaddatz, Chicago, Ill.

Application September 11, 1945, Serial No. 615,679

1 Claim. (Cl. 182—1)

My invention relates to drain conduits in the basements of dwellings and other buildings, and more particularly to devices designed to check back water from the street sewer when the latter is flooded by heavy rains, and my main object is to provide an improved device of this kind in which back water in the drain conduit is automatically cut off when it rises to a high level.

A further object is to include an improved electrically operated valve which is actuated by the excessive rise of back water in the drain conduit to block the back flow in the same.

Another object is to provide an improved arrangement comprising a pump which automatically goes into action when the back water has been cut off to transfer excess water from the house drain conduit to the conduit connecting with the street sewer.

An important object is to design a drain control device which is simple and conveniently located.

With the above objects in view and any others which may suggest themselves from the description to follow, a better understanding of the invention may be had by reference to the accompanying drawing, in which—

Figure 1:
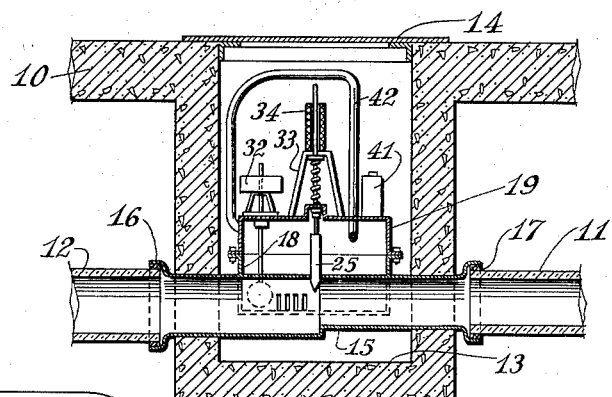
Figure 2:
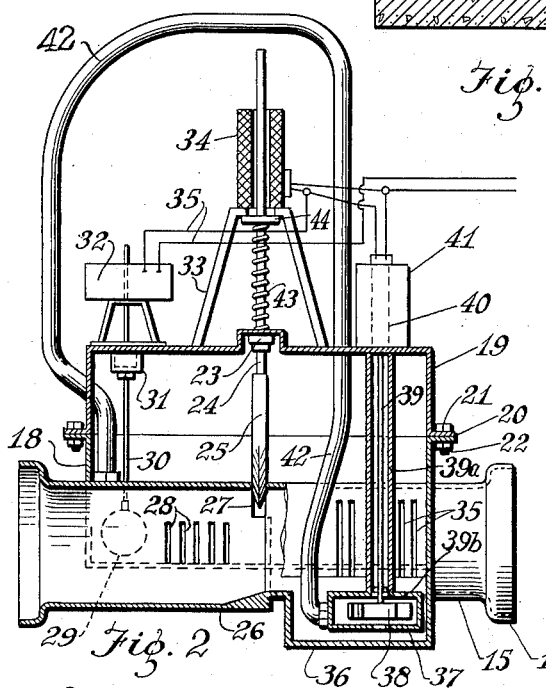
Figure 3:
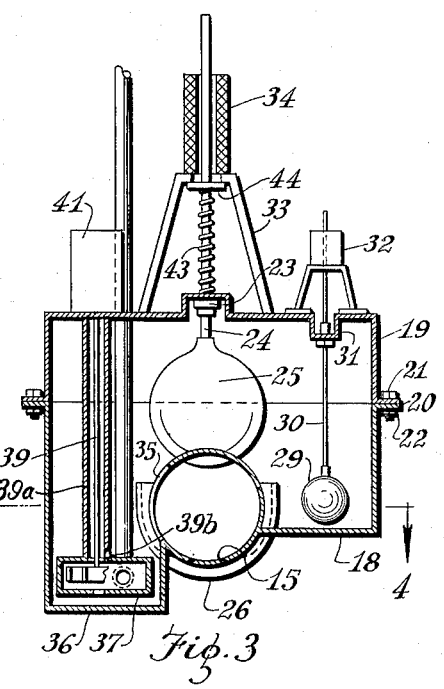
Figure 4:
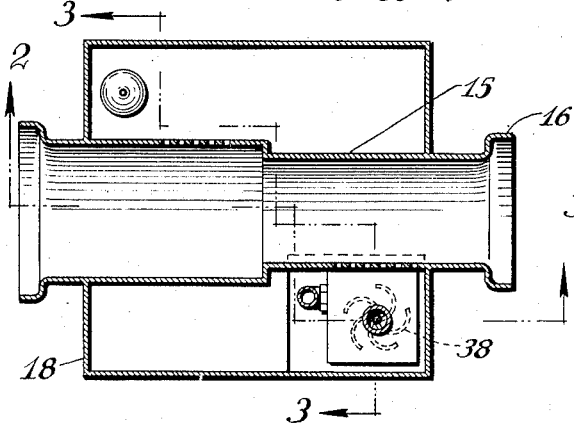

Fig. 1 is a sectional view showing the device installed;

Figs. 2 and 3 are sections on the lines 2—2 and 3—3 of Fig. 4; and

Fig. 4 is a section on the line 4—4 of Fig. 3.

Drain systems connecting with a clay sewer are subject to flooding during heavy rains due to the limited capacity of the sewer. This difficulty could be overcome by constructing a cast iron sewer, but such a process is expensive and beyond the budget of the average home owner. It has therefore been my intention to solve the difficulty by the installation of a simple and compact unit in the drain conduit, such installation being reasonable in cost.

In accordance with the foregoing, specific reference to the drawing indicates the cement basement floor at 10, the drain conduit leading from the house plumbing at 11, and that leading to the street sewer at 12. For the purpose of the present invention the floor 10 is made with a pit 13, which is covered by a removable floor plate 14.

The novel device is designed for installation as a unit in the line of the drain conduits 11 and 12 and therefore carries an intermediate pipe 15 whose ends are enlarged as indicated at 16 to receive the respective conduits and make cemented joints 17 therewith. The pipe 15 forms part of a cast housing 18 and divides the lower portion of the latter into a pair of laterally-spaced compartments. The housing receives a cover 19, the latter and the rim of the housing being marginally flanged at 20 to receive bolts 21 and nuts 22 for securing the cover to the housing.

The cover 19 is formed with a bearing 23 for the vertical passage of a stem 24 carrying a disc valve 25 at its lower end. Below the valve the pipe has a transverse pocket 26 dimensioned to receive the valve, the pocket being lined by guide flanges 27 for this purpose. Thus, Figs. 2 and 3 show that the valve has partly entered the pipe; and the valve is designed to descend into the pipe until passage in the latter is fully blocked, so that back water from the sewer conduit 12 cannot flow into the house drain conduit 11 and rise to flood the basement floor.

The portion of the pipe 15 leading to the sewer conduit 12 is made with a series of slots 28 in one side to communicate with the corresponding compartment of the housing. Such compartment contains a float 29 whose vertical stem 30 rises through a bearing 31 in the cover 19 to enter a switch box 32. A stand 33 over the cover carries a solenoid 34, the armature of which is formed by a continuation of the valve stem 24. Suitable wiring 35 is provided to complete a circuit in which the rise of the float stem 30 actuates a switch to operate the solenoid 34 in a manner to lower the valve 25 as previously mentioned. The float 29 is positioned to be raised when the water in the pipe 15 and the compartment of the housing containing the float has risen to a high level or a point approaching the top of the pipe, and the closing of the valve 25 thus prevents water at such level from passing into the portion of the pipe leading to the drain conduit 11.

It is desirable to remove the accumulation of back water in the house drain conduit in order to render the same normally serviceable, and means are provided in the unit for this purpose. It is noted that the portion of the pipe 15 leading to the drain conduit 11 is formed with a series of slots 35 on the side opposite from the slots 28. Water from the pipe can therefore also pass into the corresponding compartment of the housing, and such compartment has a bottom sump 36. The latter contains a casing 37 for a pump 38 whose shaft 39 rises through a columnar extension 39a of the casing, the extension containing an inlet 39b. The shaft rises through the cover 19 to form the armature 40 of an electric motor 41 included in the circuit of the solenoid and operable concurrently with the same, The casing 37 communicates with a tube 42 which leads into the top of the portion of the pipe 15 which connects with the drain conduit 12, the tube 42 in by-passing relation to the valve rising with a loop sufficiently high normally to preclude the passage of back water from such portion through the tube. The pump by going into action when the valve 25 is closed removes water standing in the drain conduit 11 and the compartment of the housing served by the pipe slots 35, transferring such water to the outgoing portion of the pipe. The house drains thus become cleared; and the restoration of the sewer circulation will cause the water level in the outgoing pipe portion and float chamber to fall. Now the switch in the box 32 will cut off the solenoid current. A coil spring 43 carried by the valve stem 24 and originally compressed by a stem washer 44 will now retract the valve and restore communication between the drain conduits 11 and 12.

It will be evident from the above description that a unit is provided which acts automatically in the event a tendency arises to flood the house drain system, stopping the back water from rising in the same. The automatic feature not only relieves the occupants of the house of concern or attention in case the emergency arises, but also saves flooding and damage in the event of a rainstorm or downpour when the occupants are away. Further, the housing sections provide room for the float and pump units, leaving the pipe 15 clear of obstructions when in normal operation. In addition, the device is a self-contained unit which may be easily installed by the average plumber and occupies a position which is out of the way and concealed from view. Further, the provision of a convenient basement pit for the device renders it easy to install, remove or attend. Finally, the device is of a character to be inexpensively built and sold at a reasonable figure.

While I have described the invention along specific lines, various minor changes or refinements may be made therein without departing from its principle, and I desire to consider such changes and refinements as coming within the scope and spirit of the appended claims.

I claim:

A drain control device designed to be interposed between a house drain and a conduit leading to a sewer, comprising a housing, alined pipe sections disposed in the lower portion of the housing and with their outer ends connecting with said house drain and conduit, respectively, said pipe sections being normally in communication at their inner ends and dividing the lower portion of the housing into a pair of laterally spaced compartments, openings in opposite sides of said pipe sections and communicating with said compartments to connect them with the house drain and conduit, respectively, a valve in the upper portion of the housing and movable downwardly to shut off communication between the inner ends of the pipe sections, a float in the compartment communicating with the conduit and liftable by an abnormal rise of water in such compartment, means operated by the rise of the float to procure the stated movement of the valve, a pump chamber in the bottom of the compartment communicating with the house drain and extended with an outlet tube leading into the pipe section communicating with the conduit in by-passing relation to said valve, such tube being in the form of a loop rising to a sufficient height at its intermediate portion to normally prevent the passage of back water through the tube, and means also actuated by the rise of the float to put said pump into action.

OSCAR W. KADDATZ.

REFERENCES CITED

The following references are of record in the file of this patent:

UNITED STATES PATENTS

| Number | Name | Date |
|---|---|---|
| 1,732,319 | Wagner | Oct. 22, 1929 |
| 1,779,040 | Hardacker et al. | Oct. 21, 1930 |
| 2,347,544 | DeCosta et al. | Apr. 25, 1944 |
| 2,421,066 | Howe | May 27, 1947 |